(12) United States Patent
Kawashima et al.

(10) Patent No.: US 6,519,217 B1
(45) Date of Patent: Feb. 11, 2003

(54) DATA RECORD MEDIUM, DATA RECORDING AND/OR REPRODUCING APPARATUS, AND RECORD MEDIUM DETERMINING METHOD

(75) Inventors: Tetsuji Kawashima, Kanagawa (JP); Katsumi Toyama, Kanagawa (JP); Yoichiro Sako, Tokyo (JP); Tatsuya Inokuchi, Kanagawa (JP); Shigeki Tsukatani, Kanagawa (JP); Yukio Shishido, Kanagawa (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 09/675,962

(22) Filed: Sep. 29, 2000

(30) Foreign Application Priority Data

Sep. 29, 1999 (JP) ............................................ 11-277428

(51) Int. Cl.[7] .................................................. G11B 3/90
(52) U.S. Cl. .................. 369/53.2; 369/32.01; 369/275.3
(58) Field of Search .......................... 369/32.01, 47.15, 369/47.28, 47.31, 53.2, 275.3, 30.01, 30.03, 33.01, 53.31, 53.34, 53.37, 53.41, 53.44, 53.45, 124.07

(56) References Cited

U.S. PATENT DOCUMENTS 5,850,382 A * 12/1998 Koishi et al. ............ 369/275.3

FOREIGN PATENT DOCUMENTS

| EP | 0939398 | 9/1999 |
| JP | 7262754 | 10/1995 |
| JP | 11096689 | 4/1999 |
| JP | 11120707 | 4/1999 |
| JP | 11213637 | 8/1999 |

\* cited by examiner

Primary Examiner—Paul W. Huber
(74) Attorney, Agent, or Firm—Jay H. Maioli

(57) ABSTRACT

A data recording medium having an address-representing portion formed of a predetermined number of bits for representing time information composed of minutes, seconds, and frames in a binary coded decimal notation, wherein addresses represented in a binary notation instead of the binary coded decimal notation are placed in the address-representing portion.

17 Claims, 11 Drawing Sheets

VIEW FOR EXPLAINING PRE-GROOVES

ENLARGED PERSPECTIVE VIEW OF
PRINCIPAL PORTION OF PRE-GROOVES

ATIP FORMAT OF CONVENTIONAL
CD-R OR CD-RW

ATIP FORMAT OF HIGH DENSITY DISC

Fig. 5

| M1 | S1 | F1 | CONTENTS OF INFORMATION |
|---|---|---|---|
| 0 | 0 | 0 | ADDRESS OF PROGRAM AREA AND ADDRESS OF LEAD OUT AREA |
| 1 | 0 | 0 | ADDRESS OF LEAD IN AREA |
| 1 | 0 | 1 | SPECIAL INFORMATION 1 : WRITE POWER AT REFERENCE SPEED |
| 1 | 1 | 0 | SPECIAL INFORMATION 2 : START ADDRESS OF LEAD IN AREA |
| 1 | 1 | 1 | SPECIAL INFORMATION 3 : LAST AVAILABLE START ADDRESS OF LEAD OUT AREA |
| 0 | 0 | 1 | ADDITIONAL INFORMATION 1 : SPEED RANGE, OPC PARAMETER, ERASE POWER |
| 0 | 1 | 0 | ADDITIONAL INFORMATION 2 : NOT USED (RESERVED) |
| 0 | 1 | 1 | ADDITIONAL INFORMATION 3 : NOT USED (RESERVED) |

Fig. 6

| FRAME NUMBER | CONTENTS OF FRAME |
|---|---|
| N | SPECIAL INFORMATION 1 |
| N+1 : N+9 | NORMAL ADDRESS |
| N+10 | SPECIAL INFORMATION 2 |
| N+11 : N+19 | NORMAL ADDRESS |
| N+20 | SPECIAL INFORMATION 3 |
| N+21 : N+29 | NORMAL ADDRESS |
| N+30 | ADDITIONAL INFORMATION 1 |
| N+31 : N+39 | NORMAL ADDRESS |
| N+40 | SPECIAL INFORMATION 1 |
| N+41 : N+49 | NORMAL ADDRESS |
| N+50 | SPECIAL INFORMATION 2 |
| N+51 : | NORMAL ADDRESS |

| M23 | M22 | M21 | M20 | CONTENTS OF INFORMATION |
|---|---|---|---|---|
| 0 | 0 | 0 | × | ABSOLUTE ADDRESS |
| 0 | 0 | 1 | 0 | SPECIAL INFORMATION 4 |
| 0 | 0 | 1 | 1 | AUXILIARY INFORMATION |
| 0 | 1 | 0 | × | ADDITIONAL INFORMATION 1 |
| 0 | 1 | 1 | × | ADDITIONAL INFORMATION 2 |
| 1 | 0 | 0 | 0 | COPYRIGHT CONTROL INFORMATION 1 |
| 1 | 0 | 0 | 1 | COPYRIGHT CONTROL INFORMATION 2 |
| 1 | 0 | 1 | × | SPECIAL INFORMATION 1 |
| 1 | 1 | 0 | × | SPECIAL INFORMATION 2 |
| 1 | 1 | 1 | × | SPECIAL INFORMATION 3 |

Fig. 12

| FRAME NUMBER | CONTENTS OF FRAME |
|---|---|
| N | SPECIAL INFORMATION 1 |
| N+1 <br> : <br> N+9 | NORMAL ADDRESS |
| N+10 | SPECIAL INFORMATION 2 |
| N+11 <br> : <br> N+19 | NORMAL ADDRESS |
| N+20 | SPECIAL INFORMATION 3 |
| N+21 <br> : <br> N+29 | NORMAL ADDRESS |
| N+30 | SPECIAL INFORMATION 4 |
| N+31 <br> : <br> N+39 | NORMAL ADDRESS |
| N+40 | ADDITIONAL INFORMATION 1 |
| N+41 <br> : <br> N+49 | NORMAL ADDRESS |
| N+50 | ADDITIONAL INFORMATION 2 |
| N+51 <br> : <br> N+59 | NORMAL ADDRESS |
| N+60 | AUXILIARY INFORMATION |
| N+61 <br> : <br> N+69 | NORMAL ADDRESS |
| N+70 | COPYRIGHT CONTROL INFORMATION 1 |
| N+71 <br> : <br> N+79 | NORMAL ADDRESS |
| N+80 | COPYRIGHT CONTROL INFORMATION 2 |
| ⋮ | NORMAL ADDRESS |

FORMAT OF HEADER PORTION
OF CONVENTIONAL CD-ROM

FORMAT OF HEADER PORTION
OF HIGH DENSITY CD-ROM

FORMAT OF SUB CODE OF HIGH DENSITY CD-ROM

DATA RECORD MEDIUM, DATA RECORDING AND/OR REPRODUCING APPARATUS, AND RECORD MEDIUM DETERMINING METHOD

BACKGROUND OF THE INVENTION

1. Field of the Invention

The present invention relates to a data record medium, a data recording and/or reproducing apparatus, and a record medium determining method in particular, to those that allow the compatibility with conventional mediums to be maintained and high density mediums to be handled.

2. Description of the Related Art

In recent years, optical discs as large storage capacity record mediums have been developed. Examples of such optical discs area a CD (Compact Disc) for music information, a CD-ROM for computer data, and a DVD (Digital Versatile Disc or Digital Video Disc) for movie information. These discs are read-only discs. More recently, write-once-read-many optical discs and rewritable optical discs such as a CD-R (CD-Recordable), a CD-RW (CD-Re-Writable), a DVD-R (DVD-Recordable), a DVD+RW, and a DVD-RAM (Random Access Memory) are becoming common. Since these write-once-read-many discs and rewritable discs do not contain signals in data non-written state, they need position information (address information) unlike read-only optical discs.

In a CD-R or a CD-W, guide grooves for a laser beam are wobbled and position information or time information is successively recorded as wobble information so as to successively pre-format address information. With reference to the address information obtained from wobble information, data is written on the disc. The wobble information is a signal that is frequency-modulated with a carrier of 22.05 kHz. By demodulating the signal, the address information is obtained. This address information is referred to as ATIP (Absolute Time in Pre-grooves). The address information represents absolute addresses on the disc with time information.

The absolute addresses have a format of time information composed of minutes, seconds, and frames (MSF format). Each decimal number of minutes, seconds, and frames is represented in a binary coded decimal (BCD) notation. One second is composed of 75 frames. Absolute addresses from 00 minutes, 00 seconds, and 00 frames to 99 minutes, 59 seconds, and 74 frames can be represented. In the BCD notation, one digit of a decimal number is represented with four bits of binary numbers. Thus, the ATIP requires 24 bits.

It is preferred to increase record capacities of a CD-R and a CD-RW. As pit forming technologies, recording and/or reproducing technologies, and laser technologies (for short wavelength) are improved, high density discs (with high record capacities) can be accomplished. However, when the record capacities of a conventional CD-R and a conventional CD-RW (around 650 MB each) are doubled, a time exceeding 100 minutes cannot be represented with the conventional ATIP.

OBJECTS AND SUMMARY OF THE INVENTION

Therefore, an object of the present invention is to provide a data record medium, a data recording and/or reproducing apparatus, and a record medium determining method that allow the compatibility with conventional mediums to be maintained, address information corresponding to high density structures of mediums to be represented, and that can be used for a computer.

To solve the above-described problem, a first aspect of the present invention is a data record medium having an address representing area of a predetermined number of bits for representing time information representing minutes, seconds, and frames in a binary coded decimal notation, wherein addresses represented in a binary notation instead of the binary coded decimal notation are placed in the address representing area.

A second aspect of the present invention is a data recording and/or reproducing apparatus for allowing a first data record medium and a second data record medium to be used, the first data record medium having an address representing area of a predetermined number of bits, the address representing area containing time information representing minutes, seconds, and frames in a binary coded decimal notation, the second data record medium having an address representing area of a predetermined number of bits, the address representing area containing addresses represented in a binary notation rather than the binary coded decimal notation, a predetermined one bit or a plurality of predetermined bits of the address representing area being a predetermined value or a predetermined pattern, the data recording and/or reproducing apparatus comprising: means for reproducing data contained in the address representing area; and determining means for determining the disc that is being used is the second data record medium when the predetermined one bit or the plurality of predetermined bits of the data reproduced from the address representing area is the predetermined value or the predetermined pattern.

A third aspect of the present invention is a data recording and/or reproducing apparatus for allowing a first data record medium and a second data record medium to be used, the first data record medium having an address representing area of a predetermined number of bits, the address representing area containing time information representing minutes, seconds, and frames in a binary coded decimal notation, the second data record medium having an address representing area of a predetermined number of bits, the address representing area containing addresses represented in a binary notation rather than the binary coded decimal notation, the data recording and/or reproducing apparatus comprising: means for reproducing the addresses contained in the address representing area; and means for detecting a change of the reproduced addresses and determining whether the disc that is being used is the first data record medium or the second data record medium corresponding to the change of the addresses.

A fourth aspect of the present invention is a determining method for determining whether the disc being used is a first data record medium or a second data record medium, the first data record medium having an address representing area of a predetermined number of bits, the address representing area containing time information representing minutes, seconds, and frames in a binary coded decimal notation, the second data record medium having an address representing area of a predetermined number of bits, the address representing area containing addresses represented in a binary notation rather than the binary coded decimal notation, a predetermined one bit or a plurality of predetermined bits of the address representing area being a predetermined value or a predetermined pattern, the method comprising the steps of: reproducing data contained in the address representing area; and determining the disc that is being used is the second data record medium when the predetermined one bit or the plurality of predetermined bits of the data reproduced from the address representing area is the predetermined value or the predetermined pattern.

A fifth aspect of the present invention is a determining method for determining whether the disc being used is a first data record medium or a second data record medium, the first data record medium having an address representing area of a predetermined number of bits, the address representing area containing time information representing minutes, seconds, and frames in a binary coded decimal notation, the second data record medium having an address representing area of a predetermined number of bits, the address representing area containing addresses represented in a binary notation rather than the binary coded decimal notation, the method comprising the step of: reproducing the addresses contained in the address reproducing portion; detecting a change of the reproduced addresses; and determining whether the disc that is being used is the first data record medium or the second data record medium corresponding to the change of the addresses.

According to the present invention, addresses are represented in the binary notation rather than the BCD notation. Thus, the present invention can be applied to high density (large capacity) record mediums that require more addresses than the conventional discs. The recording apparatus according to the present invention can determine the type of a disc corresponding to the address representation. Corresponding to the determined result, characteristics of servos and RF equalizer can be adjusted corresponding to the type of a disc.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 5 is a table showing the contents of information represented by the most significant bit of the conventional address format;

FIG. 6 is a schematic diagram showing the contents of successive frames of a lead in area of the conventional address format;

FIG. 12 is a schematic diagram for explaining a sequence of extra information identified with address information according to the embodiment of the present invention;

DETAILED DESCRIPTION OF THE PREFERRED EMBODIMENT

Figure 1:
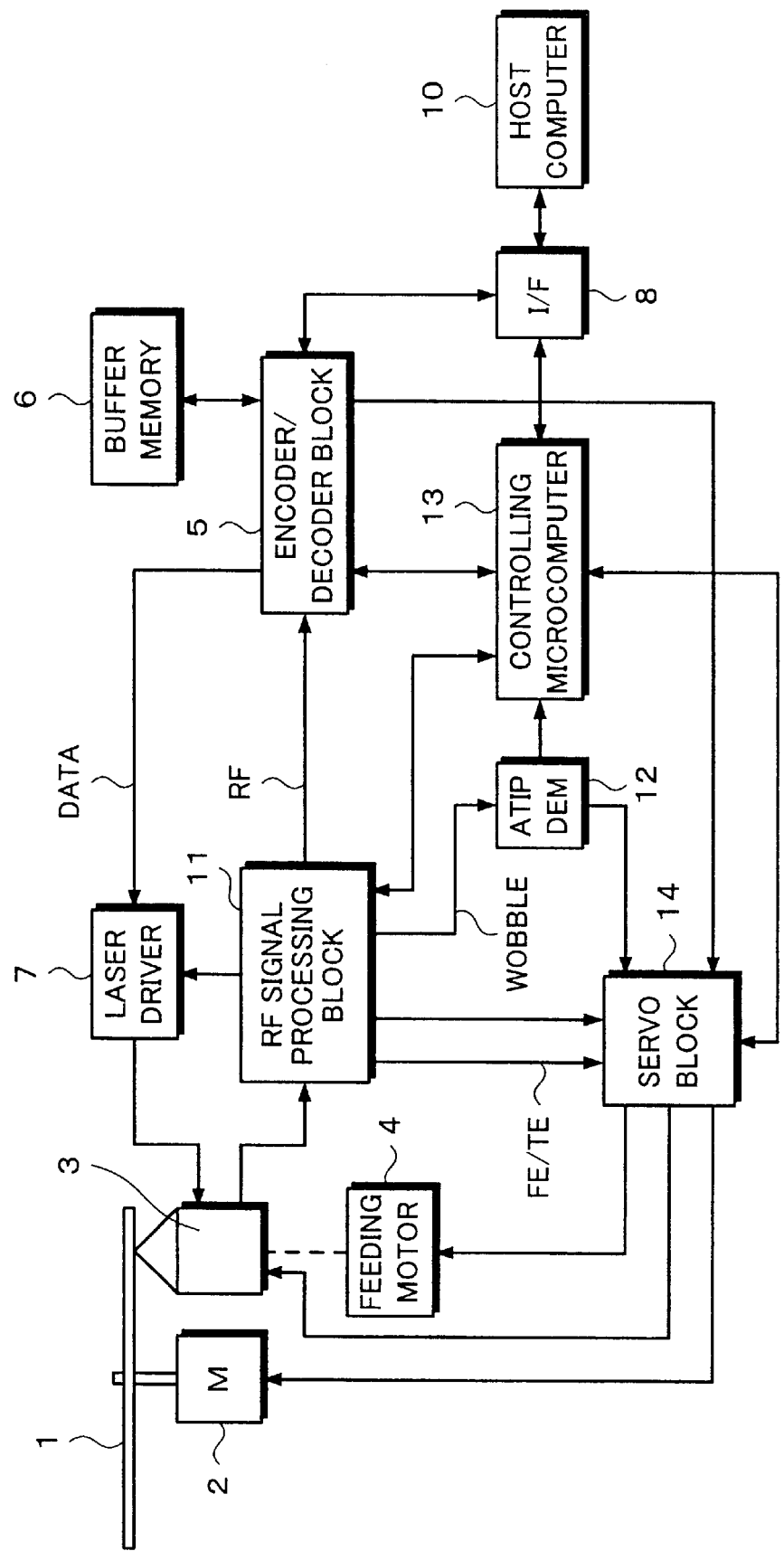
FIG. 1 is a block diagram showing the overall structure of a disc drive according to an embodiment of the present invention.

Next, with reference to the accompanying drawings, an embodiment of the present invention will be described. In the embodiment, the present invention is applied to a CD-R or a CD-RW. With reference to FIG. 1, an example of the structure of a CD-RW drive will be described. In FIG. 1, reference numeral 1 is an optical disc—for example a CD-RW. The optical disc 1 is rotated and driven by a spindle motor 2. An optical pickup 3 is disposed so as to record data to the optical disc 1 and reproduce data therefrom. The optical pickup 3 is traveled in the radius direction of the optical disc 1 by a feeding motor 4.

The optical disc 1 according to the embodiment is a phase change type disc of which data is recorded with laser light and data is reproduced by detecting the difference of reflected phase amounts. The material of the base on which a record film is coated is polycarbonate. Track guide grooves are formed on the base material by an injection molding process. They are also referred to as pre-grooves. A land is formed between adjacent grooves. Grooves are formed successively and spirally from the inner periphery to the outer periphery. As long as recordable discs, the present invention can be applied to a magneto-optical disc and a write-once-read-many type disc that uses an organic pigment as a record material.

Figure 2:
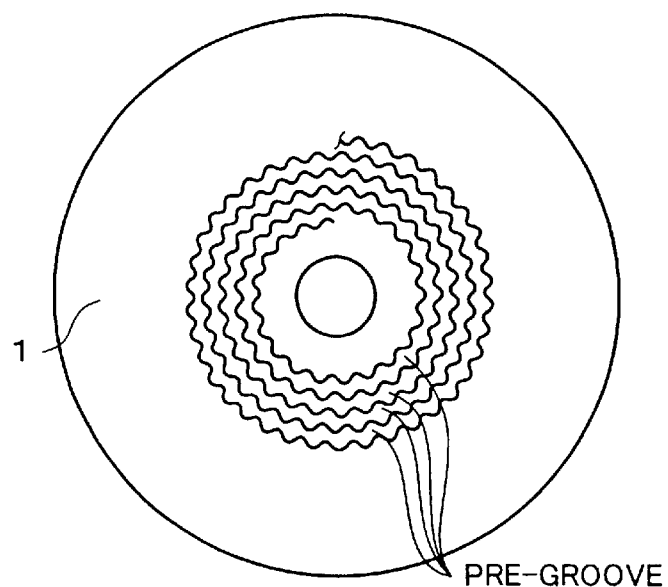
FIG. 2 is a schematic diagram showing wobbling grooves according to the embodiment of the present invention.
Figure 3:
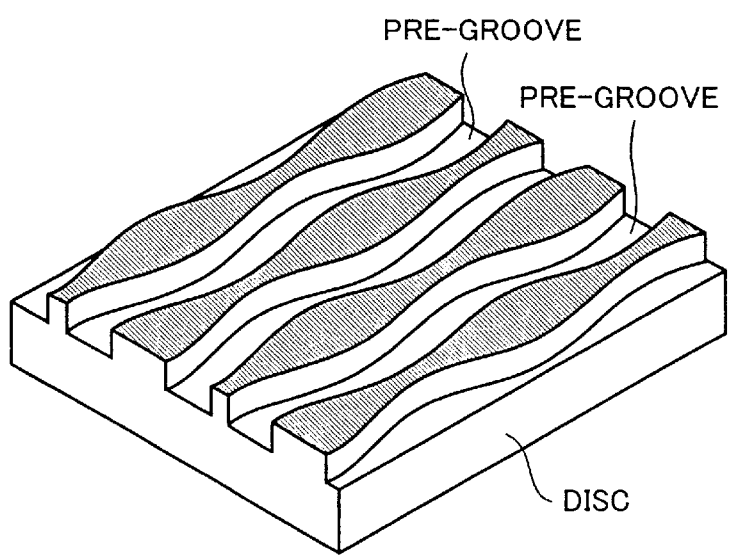
FIG. 3 is an enlarged perspective view showing wobbling grooves according to the embodiment of the present invention.

As shown in FIGS. 2 and 3, grooves are wobbled so as to control the rotation of the disc and obtain a reference signal for recording data. Data is recorded in grooves or in both grooves and lands. In addition, as wobble information of grooves, time information is successively recorded. In a CD-R or a CD-RW, with reference to an address obtained with wobble information, the optical pickup is placed at a desired write position and data is written to the disc.

Returning to FIG. 1, data is supplied from an external host computer 10 to the drive through an interface 8. An encoder/decoder block 5 is connected to the interface 8. A buffer memory 6 is connected to the encoder/decoder block 5. The buffer memory o stores write data or read data. The write data is supplied from the interface 4 to the encoder/decoder block 5. The encoder/decoder block 5 converts the write data into sector structured data. In addition, the encoder/decoder block 5 encodes the write data with an error correction code. Moreover, the encoder/decoder block 5 performs an EFM modulating process and a frame synchronous signal adding process.

In addition to the ATIP, the encoder/decoder block 5 adds addresses as a sub code to write data and to the header of data. As will be described later, according to the embodiment of the present invention, the address representing portion as the ATIP is represented in the binary notation. Addresses in the sub code and addresses in the data may be represented in the BCD notation or the binary notation.

Frame structured data is supplied from the encoder/decoder block 5 to a laser driver 7. The laser driver 7 generates a drive wave form having a predetermined level so as to record data to the optical disc 1. An output signal of the laser driver 7 is supplied to the optical pickup 3. The optical pickup 3 records the data to the optical disc 1. The laser output of the laser driver 7 is properly controlled by an APC (Automatic Power Control) of an RF signal processing block 11.

The optical pickup 3 reproduces data from the optical disc 1. A signal detected by a four-divided photo detector is supplied to the RF signal processing block 11. In the RF signal processing block 11, a matrix amplifier calculates a detection signal received from the photo detector and generates a reproduction (RF) signal, a wobble signal, a tracking error signal TE, and a focus error signal FE. The RF signal is supplied to the encoder/decoder block 5. The wobble signal is obtained as a push pull signal is supplied to an ATIP demodulator 12. The tracking error signal and the focus error signal are supplied to a servo block 14.

The encoder/decoder block 5 performs an EFM demodulating process, an error correction code decoding process (namely, an error correcting process), and a de-sectoring process (for converting sector structured data into reproduction data). In the encoder/decoder block 5, the reproduction data is stored in the buffer memory 6. When the encoder/decoder block 5 receives a read command from the host computer 10, the encoder/decoder block 5 sends read data to the host computer 10 through the interface 8.

An ATIP demodulator 12 supplies the wobble signal to an FM demodulator through a band pass filter that passes only a signal with a carrier frequency (22.05 kHz). The FM demodulator outputs a bi-phase signal. In addition, a clock signal is obtained from the bi-phase signal. The clock signal is used to control the spindle motor 2. With the clock signal, address data is extracted from the bi-phase signal. The address data is supplied from the ATIP demodulator 12 to a controlling microcomputer 13. The controlling microcomputer 13 controls the seek operation using the address. The controlling microcomputer 13 controls the interface 8, the encoder/decoder block 5, the RF signal processing block 11, and the servo block 14.

The frame synchronous signal, the tracking error signal, and the focus error signal received from the RF signal processing block 11 and the clock signal received from the ATIP demodulator 12 are supplied to the servo block 14. The servo block 14 performs a tacking servo operation and a focus servo operation for the optical pickup 3. In addition, the servo block 14 performs a spindle servo operation for the spindle motor 2 and a thread servo operation for the feeding motor 4.

In the optical disc apparatus according to the embodiment, the optical disc 1 is one of a conventional CD-R, a conventional CD-R, and a high density disc that has a higher record density than them. As will be described later, a process for determining the type of a disc is performed. Corresponding to the determined result, the servo characteristics and so forth are adjusted or switched. The type of the disc is determined corresponding to data of the ATIP that is read from the disc under the control of the controlling microcomputer 13.

In a CD-R or a CD-RW, grooves are wobbled corresponding to FM (FSK) at a frequency of ±1 kHz with a carrier of 22.05 kHz. When the FM signal is demodulated, a bi-phase signal is obtained with a clock of 6.3 kHz. When the bi-phase signal is demodulated, data of 3150 bits/sec is obtained. Since one second is equivalent to 75 frames, one frame of ATIP data is composed of 42 bits.

Figure 4A:
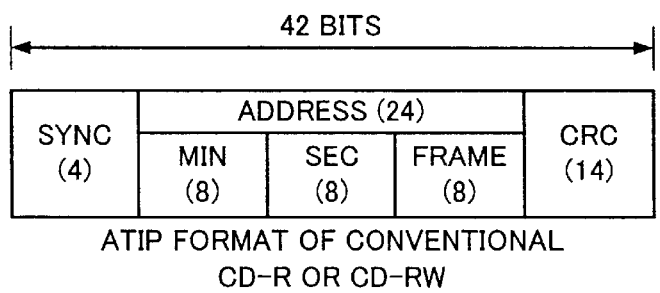
FIG. 4A is a schematic diagram showing a conventional address format.

FIG. 4A shows the data structure of one frame of the ATIP of a conventional CD-R or CD-RW. The first four bits represent a synchronous signal. The next 24 bits represent an address representing portion. The last 14 bits represents a CRC (Cyclic Redundancy Code). The synchronous signal has a pattern that does not take place in a bi-phase mark. Every eight bits of the 24 bits represent a decimal number of each of minutes, seconds, and frames of an address in the BCD notation. Thus, the ATIP can represent addresses of up to 99 minutes, 59 seconds, and 74 frames. Assuming that the data amount of one frame is 2 kbytes, such addresses are equivalent to around 900 Mbytes.

Figure 4B:
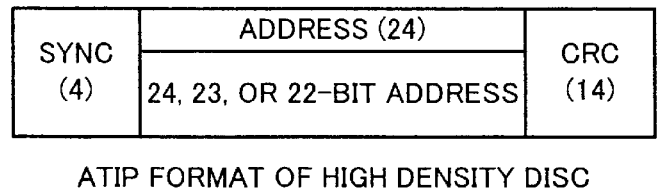
FIG. 4B is a schematic diagram showing an address format according to the embodiment of the present invention.

According to the embodiment of the present invention, as shown in FIG. 4B, in a high density disc, the address representing portion of 24 bits is represented in the binary notation. When 24 bits are represented in the binary notation, addresses of 2=16777216 can be represented. Thus, assuming that the data amount of one frame is 2 kbytes, data of up to around 33 Gbytes can be addressed. Thus, addresses corresponding to a high density disc can be represented.

When 23 bits are used in the binary notation, up to around 16.778 Gbytes can be addressed. When 22 bits are used in the binary notation, up to around 8.39 Gbytes can be addressed. When 21 bits are used in the binary notation, up to around 4.19 Gbytes can be addressed. When 20 bits are used in the binary notation, up to around 2.10 Gbytes can be addressed. Thus, without need to use all 24 bits, data of a high density disc can be addressed.

In the conventional CD-R or CD-RW format, in combinations of high order four bits of M, S, and F that are not actually used (namely, always "0"), information other than addresses is represented (this information is referred to as extra information). With respect to the most significant bit of M (minutes), when M is 99 minutes, the most significant bit may become "1". However, in reality, there are no discs for recording data exceeding 80 minutes. Thus, the most significant bit does not become "1". The extra information is placed in the lead in area. Only an address is placed in the program area and the lead out area.

FIG. 5 shows information represented with combinations of three bits of the most significant bits M1, S1, and F1 of MSF. For example, (M1, S1, F1=000) represents the address of the program area and the address of the lead out area. The most significant bits M1, S1, and F1 and the address (M, S, F) of the program area and the lead out area are combined. (M1, S1, F1=100) represents the address of the lead in area. (M1, S1, F1=101) represents special information 1 (record power at reference speed). In addition, additional information 1, additional information 2, and additional information 3 have been defined. In the currently available format, only the additional information 1 has been defined. The special information is represented by M1="1". The additional information is represented by M1="0". These special information and the additional information are referred to as extra information.

FIG. 6 shows a sequence of frames in the lead in area of a CD-R or a CD-RW. As is clear from FIG. 6, one sequence is composed of 40 frames. At intervals of 10 frames N, N+10, and N+20, special information 1, special information 2, and special information 3 are placed. At a frame N+30, additional information 1 is placed. At other frames, normal addresses are placed. Thus, in the lead in area, at intervals of 40 frames, the most significant bit M1 becomes 0 (namely, M1="0").

The extra information represented by the most significant bits (M1, S1, F1) is required for high density discs of which conventional CD-R and CD-RW are extended so as to have the compatibility with conventional discs. Thus, in the high density discs, when a predetermined one bit or a plurality of predetermined bits of the 24 bits become a predetermined value, it represents addresses an extra information of the lead in area.

To allow high density discs to have the compatibility with conventional CD-R and CD-RW, when the most significant bit of the 24 bits is "0", it represents addresses of the program area and the lead out area; when the most significant bit of the 24 bits is "1", it represents addresses and extra information of the lead in area. When the most significant bit is "1", the remaining 23 bits can be used to represent the type of information and the contents thereof. Thus, the number of bits that are used to represent addresses is decreased by one (namely, the number of bits becomes 23 bits). Although 23 bits allow data of up to 16.5 GB to be addressed, it is still ten times larger than the disc capacity of a conventional disc (650 MB). Thus, the decrease of one bit does not adversely affect high density discs. As was described above, even if data is addressed with 22 bits, 21 bits, or 20 bits, a record capacity that is twice or more the record capacities of conventional discs can be handled.

In the above description, it is assumed that the type of a disc from which the ATIP is read is known (namely, a conventional CD-R, a conventional CD-RW, or a high density disc as an extended disc thereof). A disc drive that can record and/or reproduce data from/to a high density disc preferably has the compatibility with a conventional CD-R and a conventional CD-RW. Thus, the physical characteristics of servo operations (such as track pitch) of the high density discs are the same as those of the conventional CD-R and CD-RW. In addition, the number of bits of the address representing portion, a synchronous signal followed thereby, and an error correcting CRC of the former are the same as those of the latter except for the ATIP format of addresses. In the drive shown in FIG. 1, such considerations are made. Thus, such a drive should determine the type of a disc.

As an example of the method for determining the type of the disc is a CD-R, a CD-RW, or a high density disc thereof, data placed in the address representing portion (24 bits) is used. Next, several examples of the method for determining the type of a disc using data of the address representing portion will be described. As a first example of such a method, the most significant bit of the address representing portion is used.

As was described above, in a conventional CD-R and a conventional CR-RW, the lead in area contains extra information and addresses. The most significant bit (M1) of the address representing portion is "1" except for the additional information 1 (see FIG. 6). In the program area and the lead out area, the most significant bit M1 is "0". Thus, the value of the most significant bit of a high density disc is inverse of that of a conventional disc. In other words, in a high density disc, the most significant bit of the address representing portion of the lead in area is "0", whereas the most significant bit of the program area and the lead out area thereof is "1". With such a relation, corresponding to the most significant bit of data that is read from the address representing portion, the type of a disc can be determined without need to use a dedicated disc determining means.

In a conventional CD-R and a conventional CD-RW, in the case of the additional information 1, since the most significant bit of the address representing portion is "0", the most significant bit of the address representing portion of each of a plurality of frames is checked. For example, unless the most significant bit of the address representing portion of each of two successive frames is "0", it can be determined that the type of the disc is a conventional CD-R or a conventional CD-RW.

Figure 7:
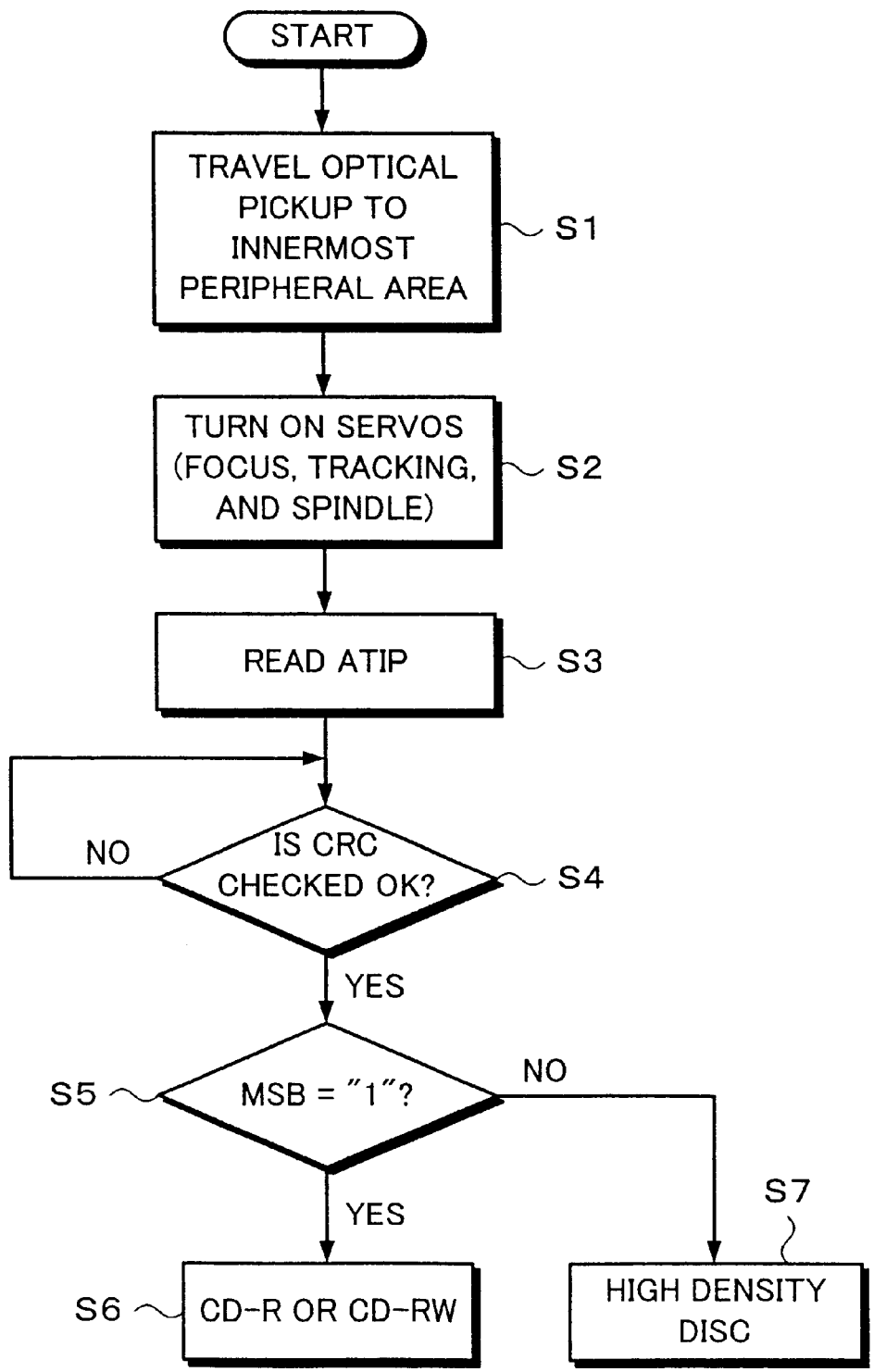
FIG. 7 is a flow chart for explaining a first example for determining the type of a disc according to the embodiment of the present invention.

FIG. 7 is a flow chart showing a process of a first example of the disc type determining method. This process is performed by the controlling microcomputer 13 shown in FIG. 1. An address is supplied from the ATIP demodulator 12 to the controlling microcomputer 13. The controlling microcomputer 13 performs a process for determining the type of a disc.

In FIG. 7, when a disc is loaded to the drive or the power of the drive is turned on, the disc type determining process is started. At step S1, the optical pickup 3 is traveled to the innermost peripheral area (lead in area) of the disc. At step S2, the focus servo, the tracking servo, and the spindle servo are turned on. Thus, in this state, the ATIP can be read. At step S3, the ATIP is read from the lead in area. The ATIP is supplied from the ATIP demodulator 12 to the controlling microcomputer 13.

The CRC of the ATIP is checked (at step S4). When the determined result at step S4 is Yes (namely, the CRC is free of an error), the flow advances to step S5. At step S5, it is determined whether or not the MSB (Most Significant Bit) of the ATIP is "1". When the determined result at step S5 is Yes (namely, MBS="1"), it is determined that the disc being loaded is a CD-R or a CD-RW (at step S6). When the determined result at step S5 is No (namely, MSB="0"), it is determined that the disc being loaded is a high density disc (at step S7). In such a manner, the type of the disc being loaded is determined. As was described above, even if the disc being loaded is a CD-R or a CD-RW, in the case of the additional information 1, the MSB is "0" as an exceptional case. In this case, step S5 is repeated for two successive frames. When the MSB is not "0" for two successive frames, it can be determined that the disc being loaded is a CD-R or a CD-RW.

When the MSB of the ATIP in the program area is "0", it is determined that the disc being loaded is a CD-R or a CD-RW. When the MSB of the ATIP in the program area is "1", it is determined that the disc being loaded is a high density disc. Thus, even in the program area, the type of a disc can be determined. Corresponding to the determined result, the controlling microcomputer 13 controls the servo block 14 and so forth so as to adjust or select the parameters of the servos, the characteristics of the RF equalizer, and so forth corresponding to the type of the disc being loaded.

Next, a second example of the disc type determining method will be described. The second example is a modification of the first example. In the second example, the type of a disc is not determined in the program area. In the program area, the MSB of the ATIP is "0". In the lead in area, when the disc being loaded is a high density disc, the MSB of the ATIP is "0" for addresses, whereas the MSB of the ATIP is "1" for extra information. In the lead in area, extra information is represented once every 10 frames. Thus, when the disc being loaded is a high density disc, the MSB of the ATIP in the lead in area is almost "0". In other words, when the ATIP is read from the lead in area and the MSB of the ATP of which CRC is free of an error is almost "1", it can be determined that the disc being loaded is a CD-R or a CD-RW. In contrast, when the MSB is almost "0", it can be determined that the disc being loaded is a high density disc.

According to the second example, in the program area, the MSB of the address is "0" regardless of which the disc being loaded is a conventional disc (CD-R or CD-RW) or a high density disc. Thus, the type of the disc being loaded cannot be determined. However, when the disc is loaded to the drive, the optical pickup is traveled to the innermost peripheral portion of the disc and the lead in area thereof is read. Since the type of the disc is determined in the lead in area, the operations that follow can be properly performed. In addition, when the type of the disc is determined, the MSB of the data of the address representing portion is checked for 10 or more successive frames. When the MSB of the data of the address representing portion is "0" for 10 or more successive frames, it is determined that the optical pickup is placed at the program area. In this case, the optical pickup is traveled to the lead in area. In the lead in area, the type of the disc is determined.

Figure 8:
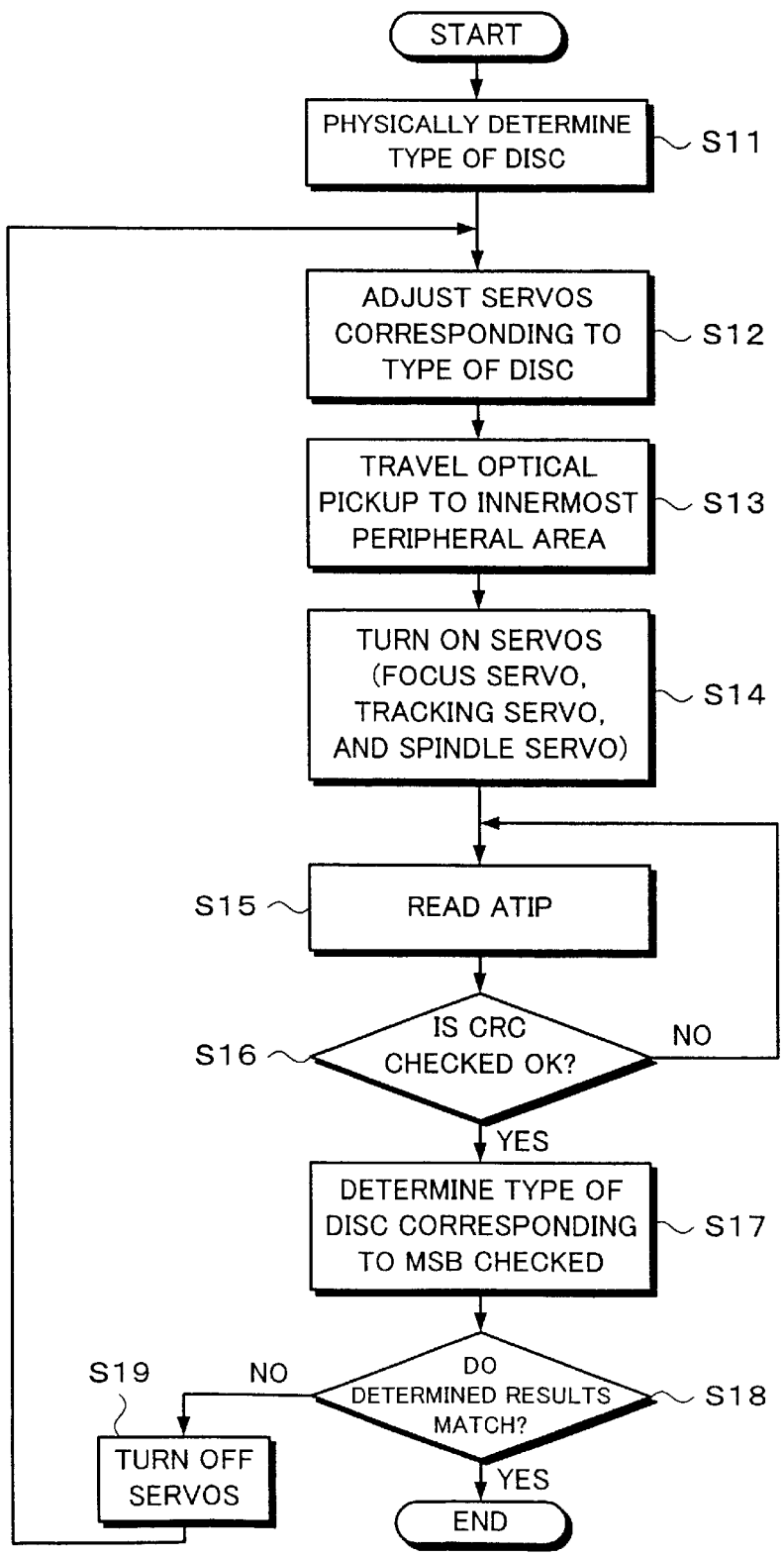
FIG. 8 is a flow chart for explaining a third example for determining the type of a disc according to the embodiment of the present invention.

Next, a third example of the disc type determining method will be described. In the third example, the address representing portion is used. In the third example, it is assumed that the MSB of the address representing portion of the lead in area of a CD-R or a CD-RW is "1" except for the additional information 1. In contrast, the MSB of the address representing portion of the lead in area of a high density disc is "0". In the third example, when the type of a disc is determined, physical characteristics are also considered. FIG. 8 is a flow chart showing the process of the third example of the disc type determining method.

In FIG. 8, when a disc is loaded to the drive or the power of the drive is turned on, the disc type determining process is started. At step S11, the type of the disc is physically determined. In other words, the type of the disc is determined corresponding to the physical characteristics of the disc. In reality, the type of the disc is determined corresponding to the track pitch or line density. The determined result is stored. In addition, servo adjusting operations for a servo gain and so forth are performed (at step S12).

At step S13, the optical pickup is traveled to the innermost peripheral area of the disc (namely, the lead in area). At step S14, the focus servo, the tracking servo, and the spindle servo are turned on. In this state, the ATIP can be read. At step S15, the ATIP of the lead in area (data of the address representing portion) is read.

Thereafter, the CRC of the ATIP is checked (at step S16). When the determined result at step S16 is Yes (namely, the CRC is free of an error), the flow advances to step S17. At step S17, the MSB (Most Significant Bit) of the ATIP is checked so as to determine the type of the disc. This disc type determining method is the same as the above-described first example. In other words, when the MSB of the ATIP is "1" (namely, MSB "1"), it is determined that the disc being loaded is a CD-R or a CD-RW. In contrast, when the MSB of the ATIP is "0", it is determined that the disc being loaded is a high density disc.

Thereafter, at step S18, the determined result obtained at step S17 is compared with the physically determined result. When the determined result at step S18 is Yes (namely, they match), since the determination has been properly performed, the process is completed. When the determined result at step S18 is No (namely, they do not match), the flow advances to step S19. At step S19, the servo operations are turned off. Thereafter, the flow returns to step S12. At step S12, corresponding to the determined result obtained at step S17 (namely, the checked result of the MSB), the servo adjustments are performed once again. Thereafter, the flow advances to step S13.

In addition to the first, second, and third examples of the disc type determining method, part or all the address representing portion of 24 bits represented in the binary notation for a high density disc is successively or temporarily formed as a special pattern that does not take place in a CD-R or a CD-RW, the type of the disc can be determined. In reality, the following method can be used.

The LSB (Least Significant Bit) of each address of the program area is fixed to "1" or "0". In a CD-R or a CD-RW, "1" and "0" alternately take place. Thus, corresponding to the LSB, the type of the disc can be determined.

In the lead in area, the LSB is fixed to "1". In the program area, the LSB is fixed to "0". Alternatively, in the lead in area, the LSB is fixed to "0". In the program area, the LSB is fixed to "1". Thus, the type of the disc can be determined. In addition, the lead in area can be distinguished from the program area.

Using a particular bit other than the LSB, the type of a disc can be determined. Alternatively, a particular pattern of all "0s" is periodically placed. In this case, although the accessibility slightly deteriorates, corresponding to such a known pattern, a high density disc can be distinguished from a CD-R or a CD-RW. Such a periodical pattern may be formed with a part of 24 bits.

Next, a method for determining the type of a disc without need to add identification information to data of the address representing portion (24 bits) will be described. In this method, an address contained in the address representing portion is reproduced. The change of reproduced addresses is detected. Corresponding to the detected change, the type of the disc is determined.

Figure 9:
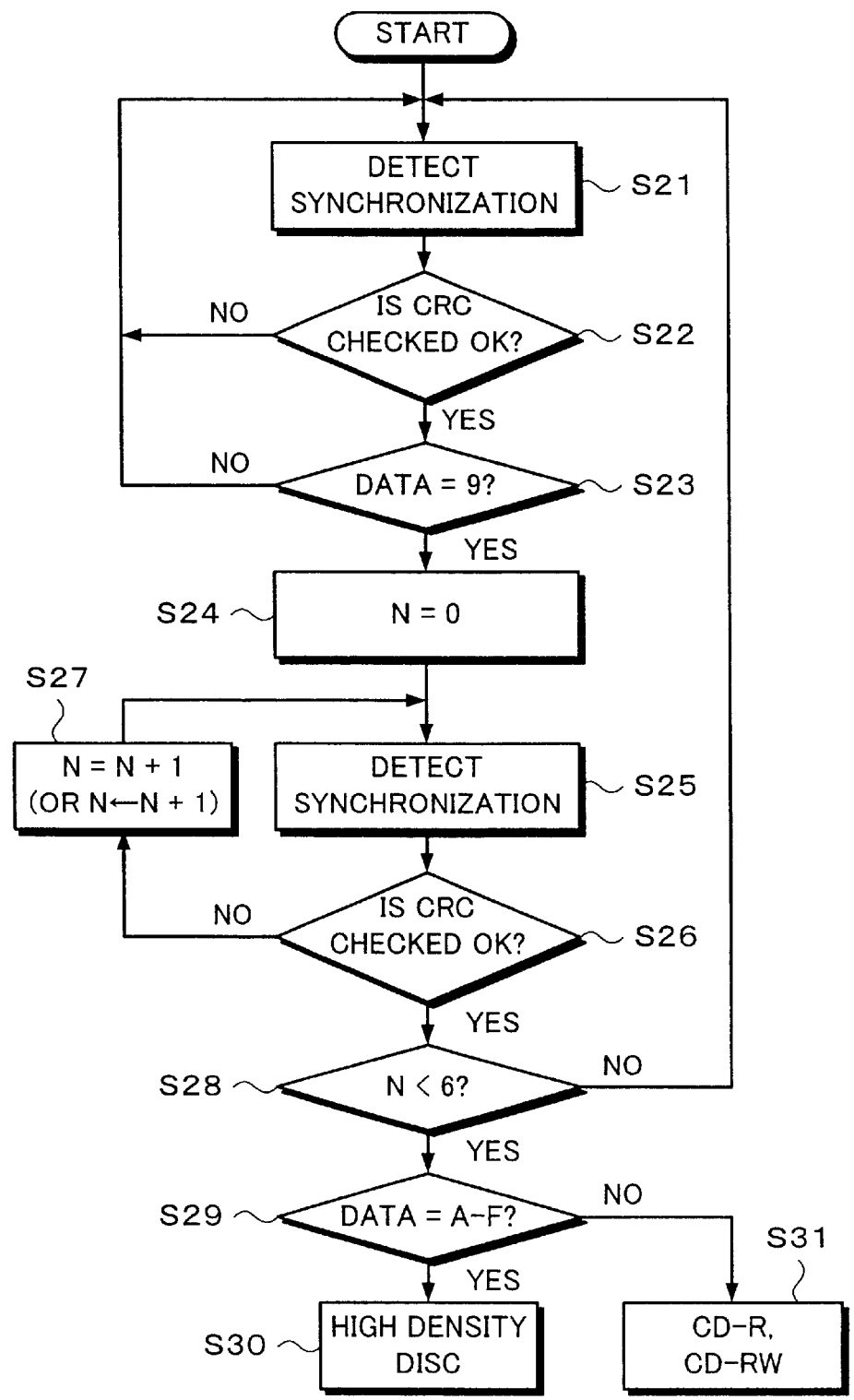
FIG. 9 is a flow chart for explaining an example for determining the type of a disc without need to add special identification information according to the embodiment of the present invention.

FIG. 9 is a flow chart showing an example of such a disc type determining method. In the method shown in FIG. 9, when four low order bits including the LSB are represented in the BCD notation, "9" is followed by "0". In the binary notation, "9" is followed by "A". Using such characteristics, the type of a disc is determined. The four bits to be checked are generally represented as bit (4n) to bit (4n+3) (where n is an integer in the range from 0 to 5; bit 0 is the least significant bit). However, as the value of n becomes large, the update frequency becomes low. Thus, to quickly perform the process, it is preferred to determine the type of a disc using low order four bits including the LSB.

FIG. 9 shows a process performed after the servo operations are performed and the ATIP is read until the type of the disc is determined. At step S21, a synchronous signal is detected. At step S22, a CRC is checked. When the determined result at step S22 is Yes (namely, the CRC is free of an error), the flow advances to step S23. At step S23, data of low order four bits including the LSB (address) is read. It is determined whether or not the value of the low order four bits is "9". Until the value of the low order four bits becomes "9", a cycle from step S21 to step S23 is repeated.

When the value of the low order four bits becomes "9", the flow advances to step S24. At step S24, the number of times N is set to "0". Thereafter, a synchronous signal is detected (at step S25). A CRC is checked (at step S26). When the determined result at step S26 is Yes (namely, the CRC is free of an error), the flow advances to step S28. At step S28, it is determined that the number of times N is smaller than 6 (N<6). Since the number of times N is 0, the flow advances to step S29.

At step S29, it is determined whether or not the value of the low order four bits of the address representing portion is in the range from A (=1010) to F (=1111). When the address is represented in the binary notation, since "9" is followed by "A", the flow advances to step S30. At step S30, it is determined that the disc being loaded is a high density disc.

When the address is represented in the BCD notation, since "9" is followed by "0", the flow advances to step S31. At step S31, it is determined that the disc being loaded is a CD-R or a CD-RW.

The number of times N (as a parameter) is used so as to deal with a situation that after the value "9" is detected, the address of the next frame cannot be read. When the determined result at step S26 is No, the flow advances to step S27. At step S27, the number of times N is incremented by +1. Thereafter, the flow returns to step S25. At step S25, a synchronous signal is detected. At step S26, a CRC is checked. After the process is repeated six times, if the determined result at step S26 is No (namely, a CRC is not free of an error), the flow advances to step S28. At step S28, the number of times N becomes 6. The flow returns to step S21. Thereafter, the process is repeated from step S21.

Even if special identification information is not added, the disc type determining process takes a time. However, in this case, it is not necessary to assign a special pattern for determining the type of a disc.

Figures 10, 11:
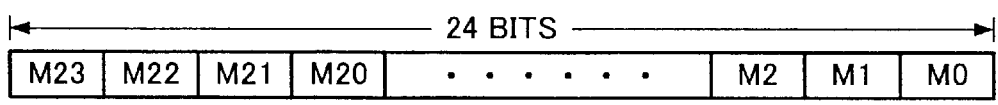
FIG. 10 is a schematic diagram for explaining a real example of address information according to the embodiment of the present invention.
FIG. 11 is a table for explaining extra information identified with address information according to the embodiment of the present invention.

Next, with reference to FIGS. 10, 11, and 12, a real example of the ATIP will be described. The 24 1bits of the ATIP are represented by M0 to M23 as shown in FIG. 10. In FIG. 10, M0 is the least significant bit, whereas M23 is the most significant bit. The high order three bits (M23, M22, and M21) of the 24 bits are used as an identifier. In the lead in area, M20 is used as an identifier. In addition, as shown in FIG. 4B, a frame synchronous signal of four bits is added. With a CRC code of 14 bits, an error detection code encoding process is performed. As a result, an ATIP frame of 42 bits is formed.

FIG. 11 is a table showing the contents of information identified by the high order four bits (M23, M22, M21, and M20). The program area and the lead out area contain only normal addresses (absolute addresses). (M23, M22, M21, M20="000X" (where X is 0 or 1) represents normal addresses.

In a recordable high density disc, the start address of the lead in area is for example A370h (0 hours, 09 minutes, 30 seconds, 50 frames as time information of the sub code). The start address of the program area is D2F0h (0hours, 12 minutes, 00 seconds, 00 frames as time information of the sub code). In this example, address information that simply increases from the innermost peripheral position of the disc is recorded as the ATIP. In other words, negative addresses do not take place in the lead in area. Thus, it is not necessary to distinguish addresses in the lead in area from those in the program area (lead out area).

In the lead in area, ATIP frames are recorded in a sequence shown in FIG. 12. Extra information is recorded at frames N, N+10, N+20, and so forth at intervals of 10 frames. Next, the extra information placed in the lead in area will be described.

(M23, M22, M21, M20=101X): Special information 1

The special information 1 is information that represents target write laser power at reference speed, reference speed, disc application (representing the purpose of the disc), disc type, and so forth. The special information 1 is composed of 21 bits except for one identification bit.

(M23, M22, M21, M20=110x): Special information 2

The special information 2 is information that represents the start address of the lead in area. For example, the special information 2 contains the above-described address A370h. In this example, the 21 bits are (000001010001101110000).

(M23, M22, M21, M20=111X): Special information 3

The special information 3 is information that represents the start address of the lead out area. The special information 3 contains for example an address 50000h. In this example, the 21 bits are (001010000000000000000).

(M23, M22, M21, M20=0010): Special information 4

The special information 4 represents a media maker code, a medium material, and so forth.

(M23, M22, M21, M20=010X): Additional information 1

The additional information 1 is information that represents functions that define the minimum speed and the maximum speed available for the CLV control and data write laser power at reference speed.

(M23, M22, M21, M20=011X): Additional information 2

The additional information is information that represents parameters for data write operations such as data write laser power.

(M23, M22, M21, M20=0011): Auxiliary information

The auxiliary information is information that represents record density, disc diameter, moment of inertia, and so forth. With the auxiliary information, the type of a disc (namely, a conventional density disc or a high density disc) can be determined.

(M23, M22, M21, M20=1000): Copyright control information 1

(M23, M22, M21, M20=1001): Copyright control information 2

The copyright control information 1 and 2 are information about copyright. The copyright control information 1 and 2 contain electronic watermark information, encryption type for copyright protection, decrypting key information, and so forth. In the example shown in FIG. 5, (M23, M22, M21, M20=100) represents the information of the address of the lead in area. However, as was described above, in a high density disc, addresses recorded thereon simply increase. Thus, it is not necessary to distinguish addresses of the lead in area. As a result, in a high density disc, with (M23, M22, M21=100), the copyright control information 1 and 2 can be placed.

Figure 13A:
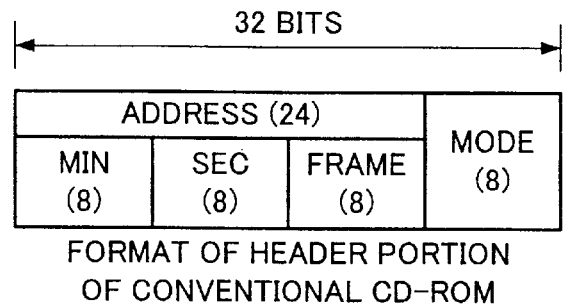
FIG. 13A is a schematic diagram showing the format of a header portion of a conventional CD-ROM.

In the above description, the address information (ATIP) was described. In a high density disc, data is recorded in for example a CD-ROM format. In the CD-ROM format, address information is placed as a header. The header portion of a conventional CD-ROM has a structure as shown in FIG. 13A regardless of the mode 0, 1, or 2. In other words, the header portion is composed of an absolute address portion (ADDRESS) of 24 bits and a mode portion (MODE) of eight bits. The absolute address portion represents the absolute address of a frame with time information of minutes (MIN), seconds (SEC), and frames (FRAME). The mode portion (MODE) represents one of the above-described modes.

The absolute address portion (ADDRESS) is composed of an absolute address minute component portion (MIN), an absolute address second component portion (SEC), and an absolute address frame portion (FRAME). Each of these portions is composed of eight bits. The absolute address portion (ADDRESS) is equivalent to the time information of the Q channel of the sub code of the above-described CD-DA (namely, they are correlated in the relation of one to one). Each of the absolute address minute component portion (MIN), the absolute address second component portion (SEC), and the absolute address frame component portion (FRAME) is represented with a two-digit BCD number.

A CD-ROM has the above-described sub code portion (not shown). The Q channel contains an absolute address represented with the above-described "MIN", "SEC", and "FRAME".

Figure 13B:
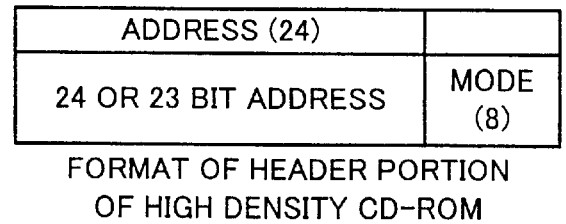
FIG. 13B is a schematic diagram showing the format of a header portion of a high density CD-ROM.

In a high density CD-ROM according to the present invention (hereinafter this CD-ROM is referred to as high density CD-ROM), to allow time information of digital data that exceeds 80 minutes or 100 minutes to be represented, as shown in FIG. 13B, all the areas of "MIN", "SEC", and "FRAME" of the header portion are represented with a 24-bit binary number. The 24 bits are address information corresponding to the above-described ATIP.

Figure 13C:
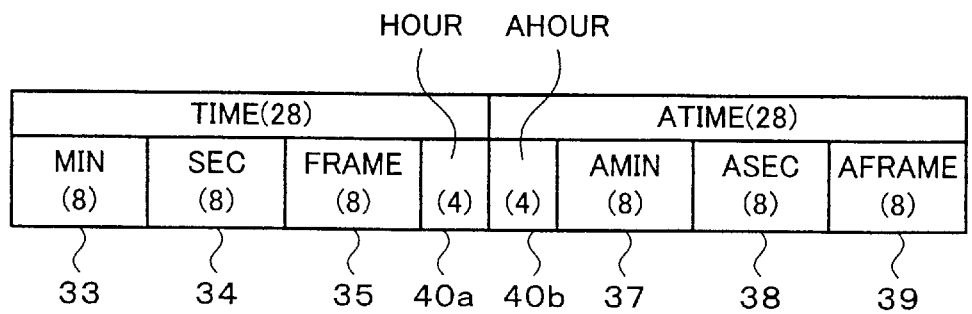
FIG. 13C is a schematic diagram showing the format of a sub code of a high density CD-ROM.

When the time information of the Q channel of the sub code of reproduced data of a CD-ROM is partly modified, longer time information than the conventional time information can be represented. In other words, the time information of the sub code contains the zero portion (ZERO) of which all eight bits are "0s". With the zero portion, the time information can be extended. FIG. 13C shows the format of the sub code of which hour information is recorded with the zone portion. The eight bits of the zero portion 36 area divided into two four-bit portions. The first four-bit area 40a is assigned to the "hour" digit (HOUR) of the relative time. The second four-bit area 40b is assigned to the "hour" digit (AHOUR) of the absolute time. Since the relative hour information is less important, in the case of a high density disc, hour information is not actually recorded. Instead, these areas contain "FF FF FF Fh". The "hour" digit of the absolute time (AHOUR) is represented in the BCD notation (0 to 9). In a high density disc, for example, the start position of the lead in area is 0 hours, 09 minutes, and 50 frames in the absolute time, whereas the start position of the program area is 0 hours, 12 minutes, and 00 frames in the absolute time.

It should be noted that the present invention can be applied to other record mediums such as memory cards as well as optical discs.

According to the present invention, since addresses are represented in the binary notation rather than the BCD notation, data of high density (capacity) record mediums can be addressed. In addition, since the number of bits of an address representing portion, a synchronous signal followed thereby, and an error detecting CRC of high density record mediums are the same as those of conventional record mediums, changes of an address detecting circuit and software can be suppressed. Thus, the compatibility with conventional record mediums can be easily maintained.

The recording apparatus according to the present invention can determine the type of a record medium using the difference of address representations. Corresponding to the determined result, the characteristics of the servos and RF equalizer can be adjusted corresponding to the type of the disc.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data recording medium comprising:
an address representing area accommodating a predetermined number of bits for representing time information representing minutes, seconds, and frames,
wherein addresses represented in a binary notation, instead of a binary coded decimal notation, are stored in the address representing area,
wherein the address representing area contains one or more bits having one of a predetermined value and a predetermined pattern, and
wherein the one or more bits of the address representing area having one of a predetermined value and a predetermined pattern allows data placed in the address representing area to be identified as information other than the addresses.

2. The data recording medium as set forth in claim 1, wherein the data recording medium is an optically recordable data recording medium, and wherein radially wobbled grooves formed in the data recording medium and contain the addresses stored as wobbling information.

3. The data recording medium as set forth in claim 1, wherein the predetermined number of bits of the address representing area is 24 bits.

4. The data recording medium as set forth in claim 2, further comprising a lead-in area and a program area, wherein the lead-in area contains addresses and non-address information as wobbling information represented in the binary notation, and wherein the program area contains addresses represented in the binary notation.

5. The data recording medium as set forth in claim 4, wherein a value of a most significant bit of each of the addresses contained in the lead-in area is different from a predetermined value of a most significant bit of each of the addresses represented in the binary coded decimal notation.

6. The data recording medium as set forth in claim 5, wherein the value of the most significant bit of each of the addresses contained in the program area is different from a predetermined value of the most significant bit of each of the addresses represented in the binary coded decimal notation.

7. The data recording medium as set forth in claim 1, wherein the predetermined value is a value of a most significant bit of the plurality of bits placed in the address representing area.

8. The data recording medium as set forth in claim 1, wherein the predetermined value is the value of the least significant bit of the plurality of bits placed in the address representing area.

9. The data recording medium as set forth in claim 1, wherein the predetermined value or the predetermined pattern is a value or a pattern, respectively, not in binary coded decimal notation.

10. A data recording and/or reproducing apparatus for allowing a first data recording medium and a second data recording medium to be used, the first data recording medium having an address representing area of a predetermined number of bits, the address representing area containing time information representing minutes, seconds, and frames in a binary coded decimal notation, the second data recording medium having an address representing area of a predetermined number of bits, the address representing area containing addresses represented in a binary notation rather than the binary coded decimal notation, one of a predetermined one bit and a plurality of predetermined bits of the address representing area being one of a predetermined value and a predetermined pattern, the data recording and/or reproducing apparatus comprising:
means for reproducing data contained in the address representing area; and
determining means for determining a disc that is being used is the second data recording medium when one of the predetermined one bit and the plurality of predetermined bits of the data reproduced from the address representing area is one of the predetermined value and the predetermined pattern.

11. The data recording and/or reproducing apparatus as set forth in claim 10, wherein the first data recording medium has grooves wobbled in the radius direction formed thereon and the address representing area contains time information representing minutes, seconds, and frames in a binary coded decimal notation, and wherein the second data recording medium contains addresses represented in a binary notation instead of the binary coded decimal notation in the address representing area.

12. A data recording and/or reproducing apparatus for allowing a first data recording medium and a second data recording medium to be used, the first data recording medium having an address representing area of a predetermined number of bits, the address representing area containing time information representing minutes, seconds, and frames in a binary coded decimal notation, the second data recording medium having an address representing area of a predetermined number of bits, the address representing area containing addresses represented in a binary notation rather than the binary coded decimal notation, the data recording and/or reproducing apparatus comprising:

means for reproducing the addresses contained in the address representing area; and means for detecting a change of the reproduced addresses and determining whether the disc that is being used is the first data recording medium or the second data recording medium corresponding to the change of the addresses.

13. The data recording and/or reproducing apparatus as set forth in claim 12, wherein the first optical disc has grooves wobbled in the radius direction formed thereon and the address representing area contains time information representing minutes, seconds, and frames in a binary coded decimal notation, and wherein the second optical disc contains addresses represented in a binary notation instead of the binary coded decimal notation in the address representing area.

14. A determining method for determining whether a disc being used is a first data recording medium or a second data recording medium, the first data recording medium having an address representing area of a predetermined number of bits, the address representing area containing time information representing minutes, seconds, and frames in a binary coded decimal notation, the second data recording medium having an address representing area of a predetermined number of bits, the address representing area containing addresses represented in a binary notation rather than the binary coded decimal notation, one of a predetermined one bit and a plurality of predetermined bits of the address representing area being one of a predetermined value and a predetermined pattern, the method comprising the steps of:

reproducing data contained in the address representing area; and determining the disc that is being used is the second data recording medium when one of the predetermined one bit and the plurality of predetermined bits of the data reproduced from the address representing area is one of the predetermined value and the predetermined pattern.

15. The determining method as set forth in claim 14, wherein the first data recording medium has grooves wobbled in the radius direction formed thereon and the address representing area contains time information representing minutes, seconds, and frames in a binary coded decimal notation, and wherein the second data recording medium contains addresses represented in a binary notation instead of the binary coded decimal notation in the address representing area.

16. A determining method for determining whether a disc being used is a first data recording medium or a second data recording medium, the first data recording medium having an address representing area of a predetermined number of bits, the address representing area containing time information representing minutes, seconds, and frames in a binary coded decimal notation, the second data recording medium having an address representing area of a predetermined number of bits, the address representing area containing addresses represented in a binary notation rather than the binary coded decimal notation, the method comprising the steps of:

reproducing the addresses contained in the address reproducing portion;

detecting a change of the reproduced addresses; and determining whether the disc that is being used is the first data recording medium or the second data recording medium corresponding to the change of the addresses.

17. The determining method as set forth in claim 16, wherein the first data recording medium has grooves wobbled in the radius direction formed thereon and the address representing area contains time information representing minutes, seconds, and frames in a binary coded decimal notation, and wherein the second data recording medium contains addresses represented in a binary notation instead of the binary coded decimal notation in the address representing area.

* * * * *